April 6, 1926.
S. TRIMBATH
1,579,900
TESTING MACHINE FOR GEAR CUTTERS
Filed May 12, 1919
4 Sheets-Sheet 2
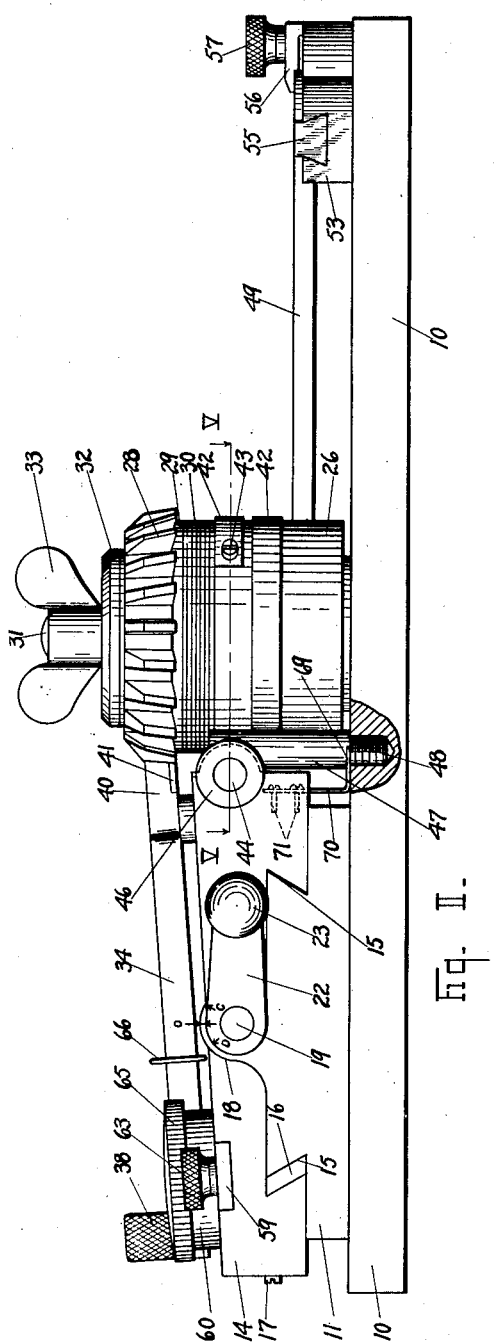
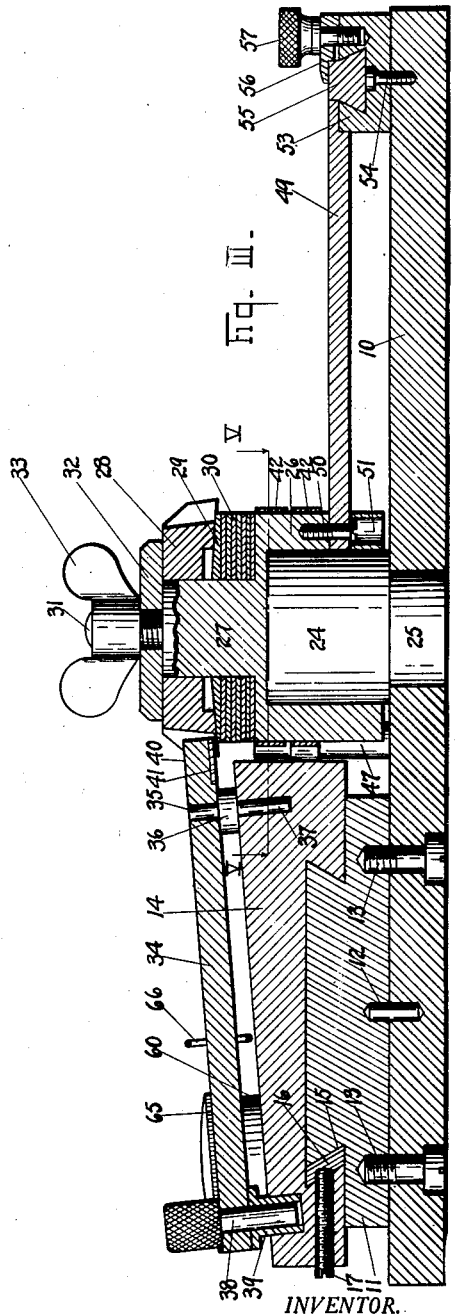
INVENTOR.
Samuel Trimbath
BY Chester W. Braselton
ATTORNEY

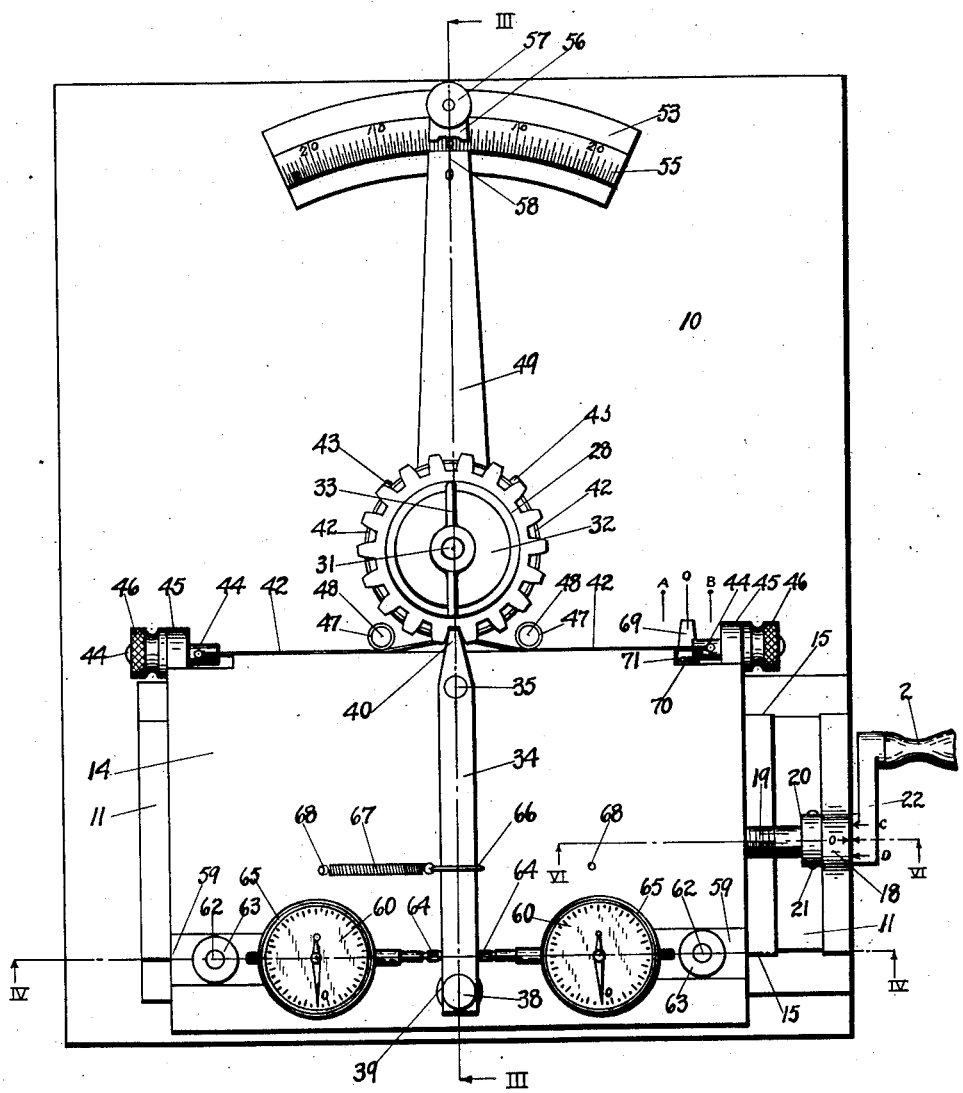

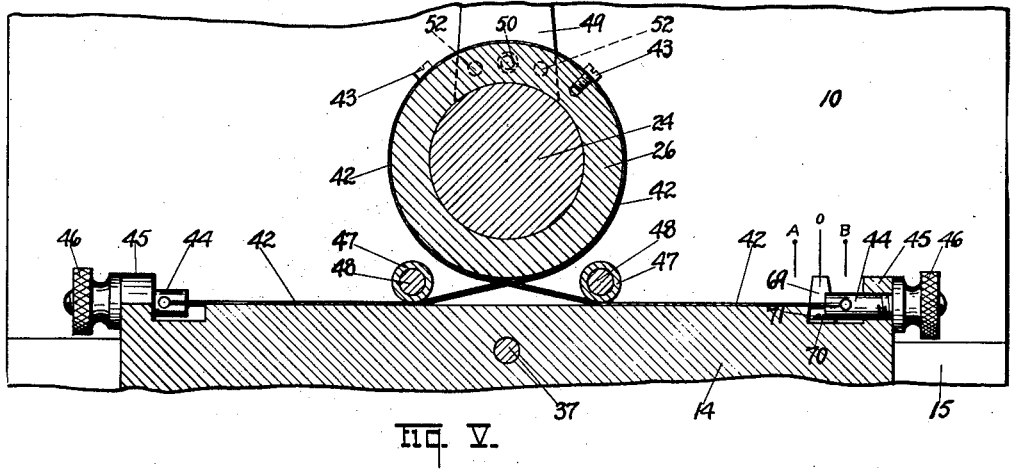
Fig. V.
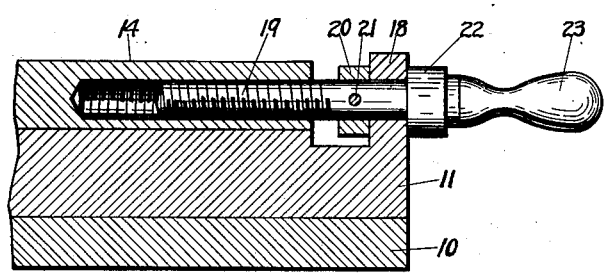
Fig. VI.
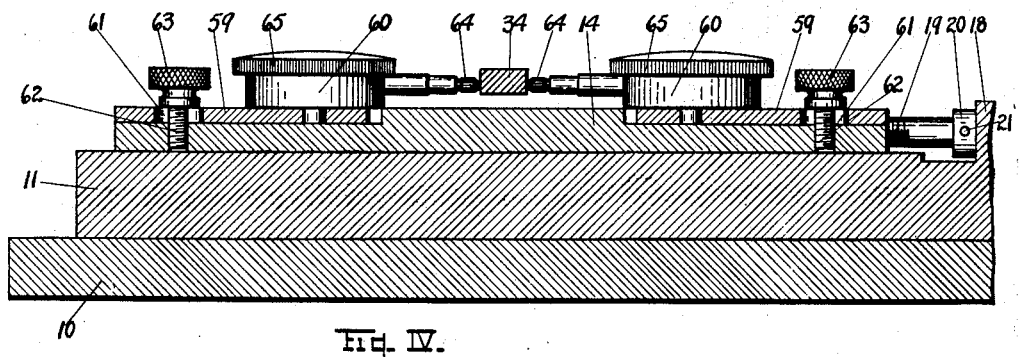
Fig. IV.

April 6, 1926.
S. TRIMBATH
TESTING MACHINE FOR GEAR CUTTERS
Filed May 12, 1919     4 Sheets-Sheet 4
1,579,900
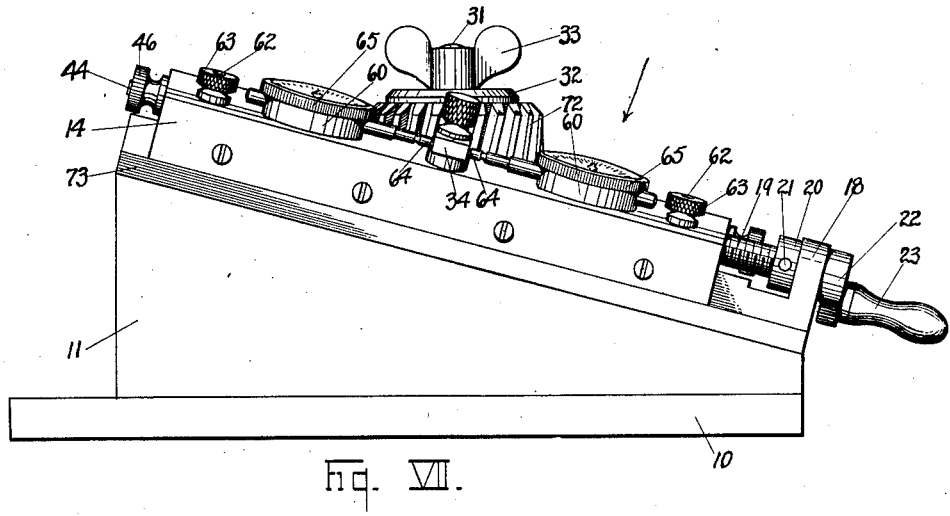
Fig. VII.
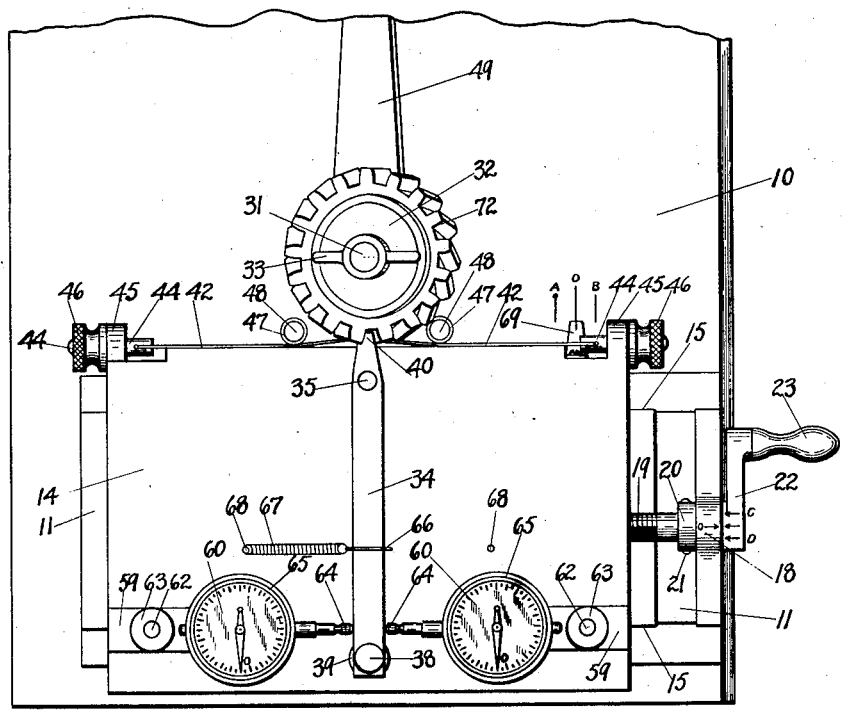
Fig. VIII.
INVENTOR.
Samuel Trimbath
BY Chester H. Braselton
ATTORNEY Patented Apr. 6, 1926.

1,579,900

UNITED STATES PATENT OFFICE.

SAMUEL TRIMBATH, OF ELMIRA, NEW YORK, ASSIGNOR TO THE WILLYS-MORROW COMPANY, OF ELMIRA, NEW YORK, A CORPORATION OF OHIO.

TESTING MACHINE FOR GEAR CUTTERS.

Application filed May 12, 1919. Serial No. 296,333.

*To all whom it may concern:*

Be it known that I, SAMUEL TRIMBATH, a citizen of the United States, residing at Elmira, county of Chemung, State of New York, have invented certain new and useful Improvements in Testing Machines for Gear Cutters, of which I declare the following to be a full, clear, and exact description.

My invention relates to a testing machine for gear cutters and the like, and has for its object to provide improved means for measuring or testing gears or gear cutters having teeth generated by the involute system.

Another object of the invention is to provide improved means for determining whether or not the teeth of a gear cutter are involute and also for measuring the pressure angle of the teeth.

Another object of the invention is to provide a machine employing a straight sided rack tooth generated by the involute system and having any desired pressure angle for measuring gears and gear cutters provided with curved or involute teeth.

Another object of the invention is to provide a machine designed for testing both helical and spur gears to determine the nature of the curve of the tooth.

To these and other ends the invention comprises certain novel features of construction and arrangement of parts, as will be hereinafter more fully pointed out and claimed; it being understood that the machine embodied in the present invention is susceptible to various modifications without departing from the spirit of the invention as expressed in the claims.

A structure illustrating one embodiment of my invention is shown in the accompanying drawings forming a part of this specification, in which:

Figure I is a plan view of a machine constructed in accordance with the invention.

Figure II is a side elevation of the same, on a somewhat enlarged scale.

Figure III is an enlarged sectional elevation taken on line III—III of Figure I.

Figure IV is an enlarged transverse sectional elevation, taken on line IV—IV of Figure I.

Figure V is a fragmentary, sectional plan taken on line V—V of Figure II.

Figure VI is an enlarged detail section taken on line VI—VI of Figure I.

Figure VII is a side elevation of the machine shown in Figure I with the slide carrying the multiplying lever inclined to provide for the measuring and testing of gears or cutters of the helical type, and Figure VIII is a view of a portion of the same looking in the direction of the arrow in Figure VII.

Like reference characters throughout the several figures of the drawings indicate corresponding parts.

Heretofore gears and gear cutters having involute or curved teeth have been tested for accuracy by master gauges manually applied to the teeth, but this method of testing has proven unsatisfactory. Furthermore, while gauges of this type may indicate that the teeth to be tested are not accurately cut, they do not afford any means for measuring or determining the pressure angle of the rack tooth used in producing the gear or cutter, nor of indicating whether or not the curve of the tooth is a true involute.

The present device will not only show whether the pressure angle of the tooth to be measured is correct but will permit the determining of the angle of the rack tooth actually used in producing the cutter tooth and if the curve of the tooth is not an involute curve, this will also be indicated.

The present invention, while useful to the manufacturers of gears, and gear cutters for producing gears having involute teeth is also useful to concerns who buy the cutters from the manufacturers and make and test their own gears and it enables them to thoroughly measure and test the cutters before using, in order that they may discard and return those which are not accurately produced.

The theory of the present invention is based on the well known fact that the involute curve when extended to a rack becomes a straight line and since the theoretically correct shape of a rack tooth of the involute system of gearing is a straight line at right angles to the line of pressure, then it can be seen that if the straight sided rack tooth produces the involute cutter tooth, the cutter tooth should also produce the straight sided rack tooth at right angles to the line of pressure of the system it represents, such as the 14½° pressure angle or the 20° pressure angle or any other pressure angle determined upon.

In carrying out the present invention to embody this theory, I employ a base 10 having at one side thereof a plate 11, which is properly centered upon the base by means of dowels 12 and then secured thereon by means of screws 13. Mounted upon the plate 11 is a slide 14 movable on dove-tail ways 15, lost motion between said parts being taken up by means of a gib 16, and screws 17 in the usual manner. The plate 11 is provided with an upstanding lug 18 forming a bearing for the feed screw 19 threaded into the slide as indicated in Figure VI. A collar 20 is secured upon the screw on the inner side of the lug 18 by means of a pin 21 whereby outward displacement of the screw is prevented. The screw is extended outwardly through the lug 18 to receive the crank arm 22 carrying the handle 23 by which the screw is rotated in opposite directions to reciprocate the slide from time to time for a purpose which will hereinafter appear. The base 10 is provided at a point adjacent the inner edge of the slide with a vertically disposed bearing 24 having a reduced portion 25 suitably anchored within an opening provided in the base, as shown in Figure III. The bearing 24 carries a hub or disc 26 having an upstanding reduced portion 27 for receiving the gear cutter 28, which it is desired to measure or test by means of the present device. Between the cutter and the shouldered portion of the hub is mounted a washer 29 beveled on its upper face to correspond with the bevel of the face of the cutter and a series of thin washers 30 are also provided for elevating the cutter to the desired point upon the hub, the reduced portion 27 of which is provided with a threaded extension 31 projecting through a washer 32 mounted on the top face of the cutter, said threaded extension being provided with a wing nut 33 for clamping the cutter in the desired position previous to the measuring or testing of the teeth thereof. The upper face of the slide 14 is planed off to extend parallel to the cutting edge of the cutter, as can be seen from Figure III, and mounted upon said slide is a multiplying lever 34 pivoted upon a pin 35 extending upwardly from the head 36 upon which said lever rests, said head being seated upon the slide and provided with a downward extension 37 projecting into the slide and secured therein in any suitable manner. The lever 34 at its outer end, is provided with a removable plug gauge 38, which projects through the lever into a hardened bushing 39, fitted in the slide as shown at the left of Figure III, said bushing having a flange at its upper end upon which the lever rests in parallel relation to the slide. The inner end of the lever constitutes a rack tooth 40 having any desired pressure angle, depending on the pressure angle of the tooth of the gear or cutter to be tested. The rack tooth on the lever is made somewhat narrower than the space between the cutter teeth to permit free movement of the lever between the teeth, and each side is ground at an angle which will bring it at a right angle to the line of pressure of the cutter teeth to be measured. Before the rack tooth is ground to the desired angle, a piece of hardened steel 41 is set in the bottom face of the tooth in a manner to permit its removal and replacement at any time. The bottom edge of the removable part 41, which is the edge that follows the tooth outline of the cutter, can be readily kept in proper condition by reason of the fact that since both sides are parallel, it can be placed upon a surface grinder and a thin cut removed from the lower side to replace the reading edge without changing the original angle of the removable member. It will be understood of course that the center line of the lever intersects the center line of the hub and gear cutter thereon whenever the removable plug gauge is inserted through the lever into the bushing 39 as shown in Figure III. When the slide is moved in either direction, the hub is rotated in unison therewith by means of the flexible steel tapes 42 wound in opposite directions upon the hub, one above the other, the inner ends of the tapes being secured to the hub by means of the screws 43 and the outer ends extending along the inner edge of the slide 14 and being suitably connected with the adjusting screws 44 which are slidably mounted in the lugs or projections 45, and adapted to be shifted longitudinally therein by means of the thumb nuts 46 upon the outer ends of the screws, said screws being prevented from turning by means of the steel tapes 42 which lie against the edge of the slide. The steel tapes are guided adjacent the hub by upstanding rollers 47 loosely mounted upon the posts 48 screwed into the base 10 of the machine, as shown in Figure II. The hub 26 is accurately ground to the pitch diameter of the cutter to be measured, and is free to rotate upon the post or bearing 24 in either direction, as one of the steel tapes is wound upon and the other unwound from the hub during movement of the slide by means of the feed screw 19 when actuated by the crank 22 and handle 23 thereon.

A horizontal steel arm 49 projects from the hub on the opposite side from the lever 34, the inner end of said arm being preferably inserted in a transverse slot in the hub below the steel tapes and anchored therein by means of a screw 50 inserted through a recess 51 in the bottom of the hub as shown in Figure III. Dowel pins 52 (Fig. V) are also provided on opposite sides of the screw for holding the arm upon the hub and are inserted through the arm into the hub from the bottom thereof.

A segmental block 53 is secured upon the upper face of the base 10 at the outer edge thereof by means of screws 54 and a circular slide 55 graduated in degrees and minutes is free to move in said block and may be held at any desired point by means of a clamp 56 engaging a portion of the face of the slide, said clamp being held by a thumb screw 57, as shown in Figure III. The arm 49 is provided with a center mark 58, which is in a line passing through the pivot point of the lever and the center of the hub and gear cutter to be measured, said mark, when the parts are in the position shown in Figure I, coinciding with the zero point of the adjustable scale 55. The slide 14 adjacent its outer edge, at points on the opposite sides of the outer end of the lever is provided with grooves in which the mounted longitudinally adjustable holders 59 carrying the indicators 60, said holders having slots through which extend screws 62 threaded into the slide, the upper ends of said screws being provided with thumb nuts 63 for clamping the holders in any desired position of adjustment. The indicators may be of any preferred type and are provided with spring pressed stems 64, the free ends of which are beveled or pointed to engage the opposite sides of the lever 34 so that when the latter is free to move, the friction between said parts will be reduced to the minimum in order not to unduly cause the deflection of the indicator hands when the slide is moved. The indictors are provided with graduated dials each having a zero point as shown, which may be brought into position to coincide with the downwardly extending hands of the indicators by rotating the adjustable rings 65 of the dials, it being understood that the holders 59 for the indicators will permit setting of the same with the stems 64 in proper engagement with the multiplying lever 34. A ring 66 is mounted upon the lever adjacent the stems of the indicators and with said ring is connected a coil spring 67, which may be shifted upon the ring to either side of the lever and connected with one of the pins 68 anchored upon the slide in any suitable manner. The spring serves to hold the rack tooth on the end of the lever against the side of the cutter tooth it is desired to take a reading from.

A horizontally extending pointer 69 is secured upon the outer edge of the slide at the right hand corner thereof and projects immediately above the base 10, said pointer having an upstanding angle portion 70 secured to the outer edge of the slide by means of screws 71, as shown in Figures I and II. A zero line is inscribed upon the base 10 and is adapted to coincide with a corresponding line on the pointer when the slide is in the position shown in Figure I, at which position the center line of the multiplying lever 70 intersects the center line of the arm carried by the rotatable hub for supporting the cutter. Two starting points or lines A and B are inscribed upon the base plate at equal distances upon the opposite sides of the zero point, and either one may be used, depending upon the direction in which the slide is to be moved, and the side of the rack tooth to be employed for taking the reading from one or the other cutter tooth upon the opposite sides of the rack tooth, it being understood that if the right hand side of the rack tooth is to be used for taking a reading that the pointer 69 will be set to coincide with the line B and if the left side is to be used, the pointer will be set to coincide with the line A, each one constituting a starting point for measuring or testing the curve of the cutter tooth to determine if it is a true involute and whether or not the rack tooth which produced the cutter tooth was of the desired pressure angle, and also for measuring the pressure angle, in case it should prove to be incorrect. To facilitate the alignment of the pointer with lines A and B, a zero line has been inscribed on the center of the boss or bearing 18 in which the feed screw 19 is rotated, as indicated at the lower right hand corner of Figure I, and two lines C and D have been inscribed on the crank 22, which lines are spaced an amount corresponding to the back-lash of the screw adjusting means. By this means, in the shifting of the slide from the zero point to either of the starting points A or B, a micrometer reading from either direction is afforded in the reciprocation of the slide by means of the feed screw 19.

The machine shown in Figures VII and VIII is the same as that shown in Figure I except that it is adapted for measuring helical gear cutters, one of which is indicated at 72. In this modification the slide and mechanism carried thereby must be inclined so that the rack tooth on the lever will cross the helix at right angles, which is accomplished by mounting the slide 14 upon a bed 73 inclined to the necessary angle as indicated in Figure VII.

In the operation of my improved machine, the gear or cutter to be measured is placed on the hub 26, the diameter of which is the same as the pitch diameter of the cutter, with the rack tooth on lever 34 between two adjacent teeth of the cutter and with a sufficient number of washers beneath the cutter to bring the cutting edge of the tooth to be measured slightly below the bottom edge of the rack tooth, as shown in Figure III; it being understood that the wing nut 33 will temporarily remain loose so that the cutter may be rotated by hand independently of the movement of the slide, and that the plug 38 is removed from the lever and the spring 67 disengaged from the pins 68 on the slide. If it is desired to take a reading of the adjacent face of the cutter tooth on the right of the rack tooth, the slide is brought to starting position by rotation of the feed screw until the line B coincides with the zero line on the pointer 69. The multiplying lever 34 is then brought to central position by the insertion of the plug 38 through the lever into the bushing 39, after which the indicators are moved until the stems 64 thereof are in contact with the opposite sides of the lever with their hands pointing down, as shown in Figure I. The thumb screws 63 for holding the indicator slides are then tightened and the rings 65 of the dials adjusted, if necessary, to bring the zero marks opposite the pointers. The cutter is now moved by hand until the involute portion of the tooth on the right of the lever 34 contacts therewith, after which the cutter is clamped in position by means of the wing nut 33. The plug 38 is then removed from the lever and the free end of the coil spring 67 is fastened to the pin 68 on the left of the multiplying lever as shown to keep the rack tooth against the side of the cutter tooth on its right. Upon removal of the plug from the lever, it is likely that the indicator hands will show that the lever has moved slightly from its original position, and if such is the case, it is brought back to said position and the hands returned to the zero point on the dial, by rotating the hub and cutter thereon without movement of the slide. This is accomplished by suitably turning the thumb nuts 46 to adjust the screws 44 with which the steel tapes 42 are connected, and by which independent rotation of the hub and cutter is effected.

The slide is now slowly moved to the left, during which movement the cutter rotates clockwise while the tooth 40 slides over the face of the particular tooth of the cutter being tested. The operator carefully watches the indicators during this movement to detect any pivotal movement of the lever 34. If no movement occurs, it may be assumed that the cutter tooth was formed by a rack tooth similar to and representing the same pressure angle as the tooth 40 on the lever 34, and that the face of the cutter is a true involute. If, during the movement of the slide, the indicator pointer moves first in one direction and then in the other, the indication is that the face of the cutter tooth is not an involute. Again, if during the movement of the slide, the pointer of the indicator, say at the left, moves continuously in one direction, the presumption is that the angle of the rack tooth 40 is not the same as the angle of the rack tooth which produced the cutter. Should such be the case, the size of the angle of the rack tooth which produced the cutter may be readily determined. By turning the adjusting units 46 the operator first moves the cutter angularly a slight amount which will rock the lever 34 on its pivot 35, and he then moves the slide as before, repeating this procedure if necessary, with the cutter and lever in various angular positions until a position of the cutter tooth is found where the indicator shows no pivotal movement of the lever 34 as the slide is moved. The angle of the lever 34 may then be read directly, as by a protractor, or may be calculated knowing the distance between the pivot point 35 and the point of contact of the stem 64 and knowing the distance moved by the stem from the zero position. The angle thus made by the lever 34, plus the angle of the contacting face of the tooth 40, is the angle of the face of the rack tooth which produced the cutter.

The operation of determining the length of the curve of the face of the cutter tooth will next be described. With the cutter and the lever in such position that movement of the slide causes no movement of the indicator pointer, the slide 14 is brought to its zero position and the graduated slide 55 is moved to bring its zero mark in register with the center mark 58 on the arm 49. The slide 55 is clamped in this position by the clamp screw 57. The operator then proceeds to move the slide slowly to the left until the indicator pointer shows a sudden deflection. At the moment this occurs, movement of the slide is stopped and the deflection of the arm 49 is read upon the scale of the slide 55. This deflection represents the angle through which the cutter rotated while the tooth 40 was rolling out against the face of the adjacent cutter tooth, and is a measure of the length of the involute forming that face. From that angle, it may be determined whether or not the involute is of the desired length and whether the cutter teeth are sufficiently long to give the desired clearance depth in a gear to be cut.

It will be obvious from the drawing and the above description, that when measuring the face of a tooth on the left side of the rack tooth 40, the operator will proceed in a similar manner, with the exception, of course, that the spring 67 will be hooked over the opposite pin 68 and the slide moved to the right from the mark A as a starting point.

The above described method of operation applies equally well to the modification illustrated by Figures VII and VIII, and the description therefore will not be repeated.

Having thus described my invention, what I claim as new and desire to secure by Letters Patent is:

1. In a device for testing the teeth of a gear or gear cutter, means for rotatably mounting said gear or cutter, a support arranged to move as a rack would move if driven from a perfect mounted gear or cutter, means whereby the movements of the support and cutter are thus harmonized, a rack tooth pivotally mounted on the support and adapted to engage a tooth of said gear or cutter, and means for indicating relative movement between said rack tooth and said support.

2. In a device for testing the teeth of a gear or gear cutter, the combination of means for rotatably mounting said gear or cutter, a slide arranged to have movement corresponding to that of a rack impelled by a perfect gear or cutter, means for simultaneously rotating said gear or cutter and for imparting such movement to said slide, a member pivoted on the slide and having a tooth at one end of predetermined form for engaging a tooth of said gear or cutter, and a micrometer indicator for indicating pivotal movements of said member.

3. A testing device for gear cutters and the like having teeth, the sides of which are curved, said device comprising a pivoted member provided with a rack tooth produced by the involute system and adapted to extend into engagement with the curved portion of said cutter tooth, means for simultaneously rotating the cutter and shifting the pivot point of said member as it would be shifted by a perfect cutter tooth, were the rack tooth without freedom of pivotal movement but bodily movable only in a rectilinear path tangential to the cutter, and means associated with said pivoted member to determine whether or not the cutter tooth was generated by the involute system.

4. In a device for determining the pressure angle of a gear or cutter having teeth generated by the involute system, the combination of means for rotatably mounting said gear or cutter, a movable support, a toothed member movably mounted on said support to vary the pressure angle of its tooth, and means for indicating the extent of movement between said member and said support when the gear or cutter and the member are moved simultaneously.

5. A testing device for gear cutters and the like having teeth generated by the involute system, comprising a rack tooth of a known pressure angle adapted to extend into engagement with the tooth of the cutter, means for rotating the cutter to move the tooth thereof upon the rack tooth, and means associated with the rack tooth for determining whether or not the cutter teeth have the same pressure angle as the rack tooth.

6. A testing device for gear cutters and the like having teeth generated by the involute system, comprising a rack tooth of a known pressure angle adapted to extend into engagement with the tooth of the cutter, means for rotating the cutter to move the tooth thereof upon the rack tooth, means associated with the rack tooth to determine whether or not the pressure angle of the cutter tooth is the same as the pressure angle of the rack tooth, said means permitting the determination of the difference in said angles when they vary.

7. A testing device for gear cutters and the like having teeth generated by the involute system comprising a pivoted member provided with a rack tooth of the same system and having a known pressure angle, said rack tooth being adapted to extend into engagement with said cutter tooth, means for rotating the cutter to move the tooth thereof upon said rack tooth, said means serving to simultaneously actuate said pivoted member, and a device associated with said pivoted member for indicating whether or not said cutter tooth and said rack tooth have the same pressure angle.

8. A testing device for gear cutters and the like having teeth generated by the involute system, comprising a base, a rotatable holder for said gear cutter, a slide upon the base adjacent said holder, a lever pivoted upon said slide and provided with a rack tooth of a known pressure angle adapted to extend into engagement with the side of the cutter tooth, means adapted to be actuated by said slide to rotate said holder, and a device on the slide associated with said lever for indicating the difference in the angle of the rack tooth and the cutter tooth.

9. A testing device for gear cutters and the like having teeth generated by the involute system comprising a base, a holder for the cutter rotatably mounted upon said base, the diameter of said holder being the same as the pitch diameter of the cutter, a slide upon the base adjacent the holder, a pair of flexible members wound upon said holder in opposite directions, adjusting screws upon the slide conected with the free ends of said flexible member, a lever pivoted upon the slide having a rack tooth of a known pressure angle adapted to extend into engagement with the side of the cutter tooth, means acting upon said lever to hold the rack tooth in engagement with the cutter tooth, an indicator adjustable upon the slide and adapted to be set in engagement with the lever and to indicate whether or not the cutter tooth and rack tooth have the same pressure angle, means for temporarily holding the lever in a fixed position, and means for reciprocating the slide.

10. A testing device for gear cutters and the like having teeth generated by the involute system comprising a base, a holder for the cutter rotatably mounted upon said base, the diameter of said holder being the same as the pitch diameter of the cutter, a slide upon the base adjacent the holder, a pair of flexible members wound upon said holder in opposite directions, adjusting screws upon the slide connected with the free ends of said flexible members, a lever pivoted upon the slide having a rack tooth of a known pressure angle adapted to extend into engagement with the side of the cutter tooth, means acting upon said lever to hold the rack tooth in engagement with the cutter tooth, an indicator adjustable upon the slide and adapted to be set in engagement with the lever and to indicate whether or not the cutter tooth and rack tooth have the same pressure angle, means for temporarily holding the lever in a fixed position, an arm carried by said holder and adapted to rotate therewith, an adjustable scale at the free end of said arm, and means for reciprocating the slide.

11. A testing device for gear cutters and the like having teeth generated by the involute system comprising a base, a holder for the cutter rotatably mounted upon said base, the diameter of said holder being the same as the pitch diameter of the cutter, a slide upon the base adjacent the holder, a pair of flexible members wound upon said holder in opposite directions, adjusting screws upon the slide connected with the free ends of said flexible members, a lever pivoted upon the slide having a rack tooth of a known pressure angle adapted to extend into engagement with the side of the cutter tooth, means acting upon said lever to hold the rack tooth in engagement with the cutter tooth, an indicator adjustable upon the slide and adapted to be set in engagement with the lever and to indicate whether or not the cutter tooth and rack tooth have the same pressure angle, means for temporarily holding the lever in a fixed position, a pointer upon the slide arranged to move between predetermined points upon the base in the operation of the machine, and means for reciprocating the slide.

12. In a testing device for a gear cutter or gear having involute teeth, the combination of means for rotatably mounting said cutter or gear, a member having a face corresponding to that of an involute rack tooth adapted to engage the face of one of said teeth, and means for tilting said member to vary the pressure angle thereof.

13. In a testing device for a gear cutter or gear having involute teeth, the combination of means for rotatably mounting said cutter or gear, a pivotally mounted member having a flat face adapted to have rolling engagement with a tooth of said cutter in the manner of a meshing rack tooth, means for detecting slight pivotal movements of said member, and means for varying the position of said member to change the angle of its face whereby the pressure angle of a rack tooth formed by said cutter may be determined.

14. A testing device for a gear cutter or gear having involute teeth comprising means for rotatably mounting said cutter or gear, a slide adjacent said gear, means for causing said cutter or gear and said slide to move in unison, a member pivotally connected to said slide and having a face corresponding to the faces of rack teeth shaped to mesh with said involute teeth, resilient means holding said member in contact with a tooth of said cutter or gear, means for simultaneously moving said slide and said cutter or gear, and means for indicating the angular movement of said cutter or gear.

In testimony whereof I affix my signature.

SAMUEL TRIMBATH.